(12) United States Patent
Nakano et al.

(10) Patent No.: US 12,457,236 B2
(45) Date of Patent: Oct. 28, 2025

(54) DETERMINATION DEVICE, DETERMINATION METHOD, AND DETERMINATION PROGRAM

(71) Applicant: NTT, Inc., Tokyo (JP)

(72) Inventors: Hiroki Nakano, Musashino (JP); Daiki Chiba, Musashino (JP)

(73) Assignee: NTT, Inc., Tokyo (JP)

( * ) Notice: Subject to any disclaimer, the term of this patent is extended or adjusted under 35 U.S.C. 154(b) by 215 days.

(21) Appl. No.: 18/031,620

(22) PCT Filed: Oct. 14, 2020

(86) PCT No.: PCT/JP2020/038730
§ 371 (c)(1),
(2) Date: Apr. 13, 2023

(87) PCT Pub. No.: WO2022/079821
PCT Pub. Date: Apr. 21, 2022

(65) Prior Publication Data
US 2023/0388337 A1    Nov. 30, 2023

(51) Int. Cl.
*H04L 9/40*    (2022.01)
(52) U.S. Cl.
CPC .............. *H04L 63/1441* (2013.01)
(58) Field of Classification Search
CPC ..... H04L 63/1441; G06F 21/51; G06F 21/56; G06F 21/554
See application file for complete search history.

(56) References Cited

U.S. PATENT DOCUMENTS

| | | |
|---|---|---|
| 9,083,729 B1 | 7/2015 | Doshi et al. |
| 2013/0197421 A1 | 8/2013 | Sharvit et al. |
| 2014/0283139 A1* | 9/2014 | Anand ............... G06F 21/54 726/30 |
| 2020/0234109 A1 | 7/2020 | Lee et al. |
| 2021/0136089 A1* | 5/2021 | Costea ............... H04L 41/22 |

FOREIGN PATENT DOCUMENTS

CN    109472027 A    3/2019

OTHER PUBLICATIONS

Gao et al., "Towards Online Spam Filtering in Social Networks", Available Online At: http://cucis.ece.northwestern.edu/publications/pdf/GaoChe12.pdf, Jul. 27, 2019, 16 pages.
Lee et al., "WARNINGBIRD: Detecting Suspicious URLs in Twitter Stream", Available Online At: https://www.ndss-symposium.org/wp-content/uploads/2017/09/11_1.pdf, Jul. 27, 2019, 13 pages.
Extended European Search Report issued Mar. 6, 2024 in European Patent Application No. 20957650.3, 7 pages.

* cited by examiner

*Primary Examiner* — El Hadji M Sall
(74) *Attorney, Agent, or Firm* — XSENSUS LLP

(57) ABSTRACT

A determination device includes processing circuitry configured to calculate a characteristic amount of user-generated content generated by a user in a predetermined period, perform learning by using the calculated characteristic amount of the user-generated content generated by a legitimate user and a characteristic amount of content generated by a malicious user, and determine whether the user-generated content is generated by the malicious user using a learned model.

10 Claims, 18 Drawing Sheets

Fig. 4

Japan vs United States Free live streaming click here
(japan vs united, vs united states, united states free, states free live,
free live streaming, live streaming click, streaming click here)

Fig. 7

```
Input: USER-GENERATED CONTENT SET U
Output: TEXT CHARACTERISTIC AMOUNT SET T
  for u ∈ U do
    URL WHICH EXISTS IN URL_u=u, TEXT OF TEXT_u=u
    URL_u=WordSegmentation(URL_u)
    VEC=WordEmbeddings(TEXT_u,URL_u)
```
$$t = \frac{1}{sizeOf(VEC)} \sum_{i=1}^{sizeOf(VEC)} VEC_i$$
```
    t append to T
  return T
```

Fig. 8

```
Input: USER-GENERATED CONTENT SET U, TIME THRESHOLD VALUE σ, AND SIMILARITY THRESHOLD VALUE τ
Output: GROUP CHARACTERISTIC AMOUNT SET G
  for u∈U do
    POSTED DATE AND TIME OF Time_u=u
    U_near=GroupNearTimePost(U,Time_u, σ)
    U_sim=Minhash-LSH(U_near, τ)
    g=CreateGroupFeatures(U_sim)
    g append to G
  return G
```

Fig. 9

1. Free live streaming URL1 URL1 @user1
   SAME GROUP: 2, 3, AVERAGE POSTING TIME INTERVAL OF 1, 2, 3, SET SIZE 3, NUMBER OF UNIQUE USERS OF SET 2, NUMBER OF URL UNIQUES OF SET 2, AND AVERAGE NUMBER OF URLS IN ONE CONTENT 1.67
2. Live Streaming Japan URL1 URL2 @user2
   SAME GROUP: 1, 3, AVERAGE POSTING TIME INTERVAL OF 1, 2, 3, SET SIZE 3, NUMBER OF UNIQUE USERS OF SET 2, NUMBER OF URL UNIQUES OF SET 2, AND AVERAGE NUMBER OF URLS IN ONE CONTENT 1.67
3. Live Streaming Free URL1 @user2
   SAME GROUP: 1, 2, AVERAGE POSITING TIME INTERVAL OF 1, 2, 3, SET SIZE 3, NUMBER OF UNIQUE USERS OF SET 2, NUMBER OF URL UNIQUES OF SET 2, AND AVERAGE NUMBER OF URLS IN ONE CONTENT 1.67
4. Free iPhone Giveways URL3 @user3
   SAME GROUP: 4, 5, AVERAGE POSTING TIME INTERVAL OF 4, 5, SET SIZE 2, NUMBER OF UNIQUE USERS OF SET 1, NUMBER OF URL UNIQUES OF SET 2, AND AVERAGE NUMBER OF URLS IN ONE CONTENT 1
5. iPhone Giveways URL4 @user3
   SAME GROUP: 4, 5, AVERAGE POSTING TIME INTERVAL OF 4, 5, SET SIZE 2, NUMBER OF UNIQUE USERS OF SET 1, NUMBER OF URL UNIQUES OF SET 2, AND AVERAGE NUMBER OF URLS IN ONE CONTENT 1
6. Trump President Party URL5 @user4
   THERE IS NO SAME GROUP
7. Corona Virus NEWS Sites URL6 @user5
   THERE IS NO SAME GROUP

Fig. 11

CONTENT IN WHICH CHARACTER STRING "ruby world cup" IS INCLUDED

SERVICE a:
   Text:England vs Argentina LIVE: Rugby World Cup updates as...England take on Argentina in the Rugby World Cup and Express...England vs Argentina LIVE:Rugby World Cup updates as Eddie...Rugby World Cup free live stream LIVE>> http://bit[.]ly/rugby-world-cup-
   Username: coinmaster547 PostDate: 2019/10/05
   URL:https://twitter.com/coinmaster547/status/1180417464464596993

SERVICE b:
   Text:https://pbr-2019-4k.blogspot[.]com/ Rugby World Cup 2019 Rugby World Cup 2019:TV channel,time,live stream Information,Watch Rugby World Cup 2019 Game On ITV,Sky Sports,BT Sport,Eurosport and more.
   Username:Steamz-Net-Zone-117898112929759 PostDate:2019/9/20
   URL:https://www.facebook.com/events/tokyo-stadium/rugby-world-cup-2019-live-stream-free/2144180735879174/

ARRIVAL URL:
   https://watchhdlivetv[.]online/PBR
   https://sportshdstream1[.]com/4k2/index.html?a=2&clickid=5e79a6da0a5df40001216799&pubid=6018&bg2=rugbyb.jpeg&bg1=rugbyb.jpeg&q=Unlimited%20Live%20Rugby

DETERMINATION DEVICE, DETERMINATION METHOD, AND DETERMINATION PROGRAM

CROSS-REFERENCE TO RELATED APPLICATION

The present application is based on PCT filing PCT/JP2020/038730, filed Oct. 14, 2020, the entire contents of which are incorporated herein by reference.

TECHNICAL FIELD

The present invention relates to a determination device, a determination method, and a determination program.

BACKGROUND ART

As a threat on the Web, social engineering (SE) attacks that abuse vulnerabilities in user psychology are becoming mainstream. As a guidance route to a malicious website, user-generated content such as videos, blogs, and bulletin boards generated by an attacker and posted on the Web in online services is increasing.

On the other hand, user-generated content generated by an attacker is intensively generated in large quantities in real time targeting a specific event such as a concert or sport and is spread on a large number of services under the guise of a legitimate user. Therefore, a wide range of detection techniques which are quick and highly accurate are expected.

For example, a technique for determining a malicious site using a characteristic amount for a specific service is disclosed in the related art (refer to NPL 1 and 2).

CITATION LIST

Non Patent Literature

[NPL 1] Hongyu Gao, et al., "Towards Online Spam Filtering in Social Networks", [online], [retrieved on Jul. 27, 2019], Internet <URL: cucis.ece.northwestern.edu/publications/pdf/GaoChe12.pdf>

[NPL 2] Sangho Lee, Jong Kim, "WARNINGBIRD: Detecting Suspicious URLs in Twitter Stream", [online], [Search on Jul. 27, 2020], Internet <URL: ndss-symposium.org/wp-content/uploads/2017/09/11_1.pdf>

SUMMARY OF INVENTION

Technical Problem

However, according to the related art, it is insufficient in terms of detection accuracy, detection speed, and detection range. For example, the design of the characteristic amount for detection is not appropriate and the detection accuracy and the detection range are insufficient to capture various attacks in the technique described in NPL 1. Furthermore, since the characteristic amount premised on accessing all URLs is used in the technique described in NPL 2, the detection speed is insufficient and the detection accuracy is also insufficient.

The present invention was made in view of the above description, and an object of the present invention is to detect a malicious site quickly and with high accuracy.

Solution to Problem

In order to solve the above-mentioned problems and achieve the object, a determination device according to the present invention includes: processing circuitry configured to: calculate a characteristic amount of user-generated content generated by a user in a predetermined period; perform learning by using the calculated characteristic amount of the user-generated content generated by a legitimate user and a characteristic amount of content generated by a malicious user; and determine whether the user-generated content is generated by the malicious user using a learned model.

Advantageous Effects of Invention

According to the present invention, it is possible to detect a malicious site quickly and with high accuracy.

BRIEF DESCRIPTION OF DRAWINGS

FIG. 4 is a diagram for explaining processing of a generation unit.

FIG. 7 is a diagram for explaining processing of the calculation unit.

FIG. 8 is a diagram for explaining processing of the calculation unit.

FIG. 9 is a diagram for explaining processing of the calculation unit.

FIG. 11 is a diagram for explaining threat information.

DESCRIPTION OF EMBODIMENTS

Figure 1:
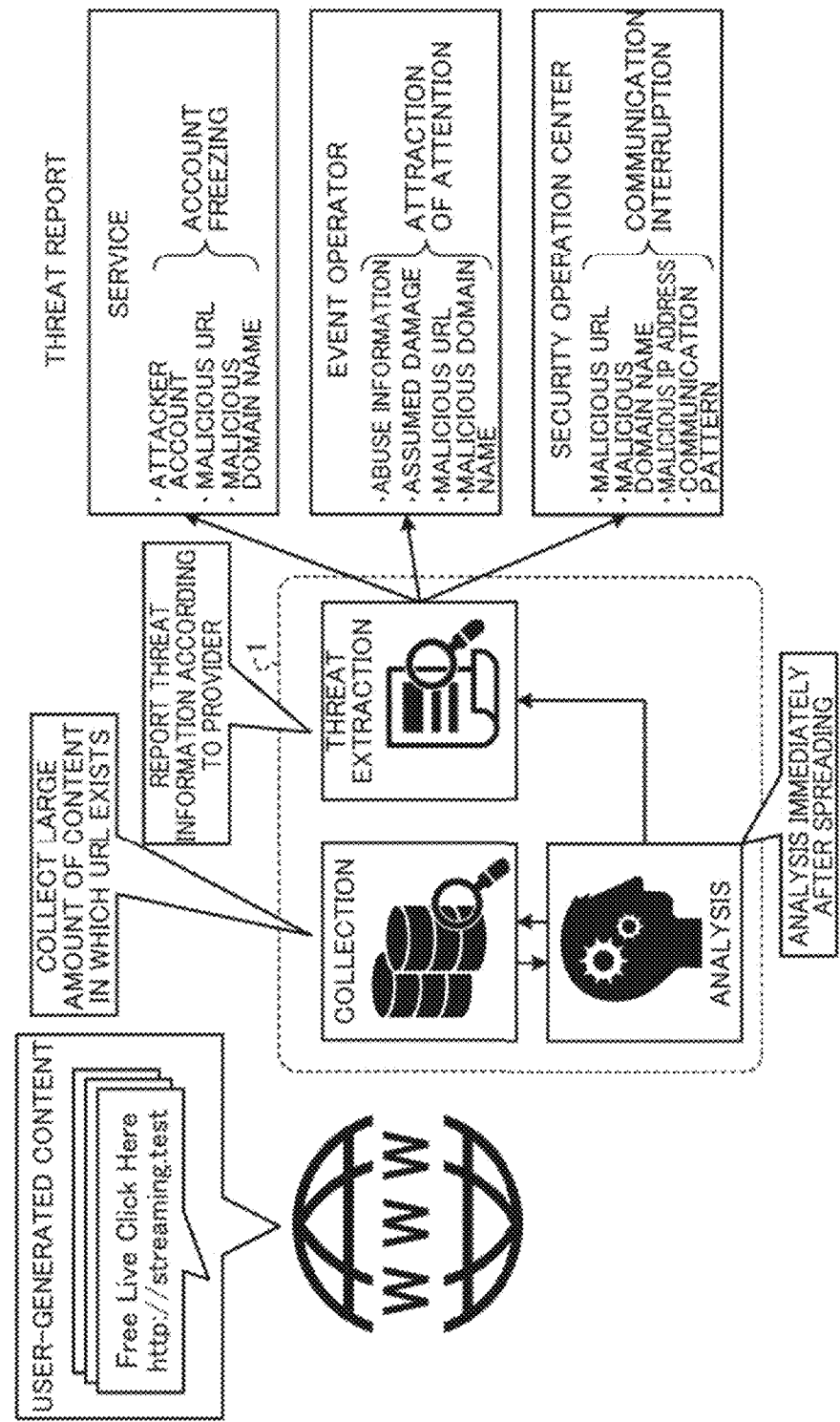
FIG. 1 is a diagram for explaining an outline of a detection device of an embodiment.

An embodiment of the present invention will be described in detail below with reference to the drawings. Note that the present invention is not limited to the embodiment. Furthermore, the same constituent elements are denoted by the same reference numerals in the description of the drawings.

[Outline of Detection Device] FIG. 1 is a diagram for explaining an outline of a detection device. A detection device 1 of an embodiment collects and analyzes user-generated content such as videos, blogs, and bulletin board postings generated by a user and posted on the Web in online services such as Facebook® and Twitter®.

Specifically, attention is focused on that an attacker generates and spreads a large amount of user-generated content intensively for an event that a user is interested in and that user-generated content is generated in a similar context that makes a user want to visit a malicious site.

Then, the detection device 1 efficiently collects user-generated content which is highly likely to be malicious by an attacker and analyzes whether it is malicious using the characteristic that user-generated content by an attacker is spread in a context similar to that at a specific timing. Furthermore, the detection device 1 extracts threat information, which is a characteristic which can be a threat, from this malicious user-generated content and outputs a threat report when it is determined that the content is malicious user-generated content as a result of analysis.

For example, the detection device 1 extracts similar contexts of user-generated content to generate a search query and efficiently collects user-generated content which is highly likely to be malicious by using the search query. In addition, a malicious determination is performed on a large amount of user-generated content of a specific service generated at the same time by learning a characteristic difference between user-generated content generated by an attacker and user-generated content generated by a legitimate user, specializing in a specific service.

Further, in any service, the detection device 1 learns a characteristic difference of the Web content obtained by accessing the URL described in the user-generated content between the user-generated content generated by the attacker and the user-generated content generated by the legitimate user. Also, the detection device 1 uses the learned characteristic difference to perform malicious determination on user-generated content generated in large quantities by an arbitrary service at the same time.

Furthermore, the detection device 1 extracts threat information, which is a characteristic which can be a threat, from the malicious user-generated content and outputs a threat report when it is determined that the content is malicious user-generated content. In this way, the detection device 1 detects an attack which can be a threat in real time.

Figure 2:
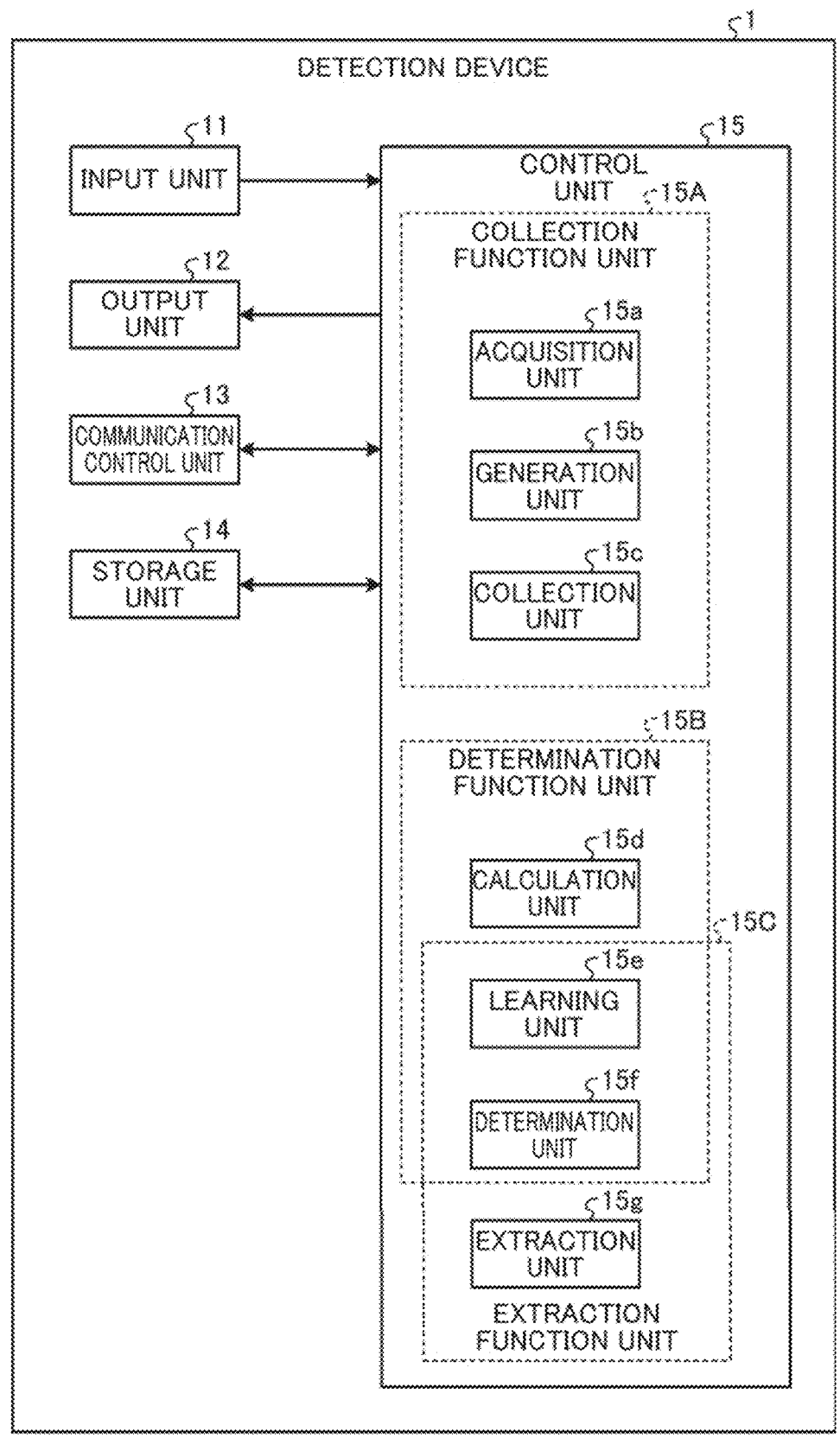
FIG. 2 is a schematic diagram illustrating a schematic configuration of the detection device of the embodiment.

[Configuration of Detection Device] FIG. 2 is a schematic diagram illustrating a schematic configuration of the detection device of the embodiment. The detection device 1 of the embodiment includes a collection function unit 15A, a determination function unit 15B, and an extraction function unit 15C, as illustrated in FIG. 2. Each of these function units may be installed in hardware different from that of the detection device 1. That is to say, the detection device 1 may be implemented as a detection system including a collection device, a determination device, and an extraction device.

The detection device 1 is realized using a general-purpose computer such as a personal computer and includes an input unit 11, an output unit 12, a communication control unit 13, a storage unit 14, and a control unit 15.

The input unit 11 is realized by using an input device such as a keyboard or a mouse and inputs various types of instruction information such as a processing start to the control unit 15 in response to an input operation by an operator. The output unit 12 is realized using a display device such as a liquid crystal display, a printing device such as a printer or the like. For example, the output unit 12 displays the result of a detection process which will be described later.

The communication control unit 13 is realized by a network interface card (NIC) or the like and controls communication between an external device and the control unit 15 via a telecommunication line such as a local area network (LAN) or the Internet. For example, the communication control unit 13 controls communication between a server or the like which manages user-generated content or the like of each service and the control unit 15.

The storage unit 14 is realized by a semiconductor memory element such as a random access memory (RAM) or a flash memory (Flash Memory), or a storage device such as a hard disk or an optical disc. The storage unit 14 stores in advance a processing program for operating the detection device 1, data used during execution of the processing program, and the like, or temporarily performs storing each time the processing is performed. Note that the storage unit 14 may be configured to communicate with the control unit 15 via the communication control unit 13.

The storage unit 14 stores threat information and the like obtained as a result of the detection process which will be described later in the embodiment. Furthermore, the storage unit 14 may store user-generated content acquired by an acquisition unit 15a, which will be described later, from the server or the like of each service before the detection process.

The description will be provided with reference to FIG. 2 again. The control unit 15 is realized by using a central processing unit (CPU) or the like and performs a processing program stored in a memory. As a result, the control unit 15 functions as the collection function unit 15A, the determination function unit 15B, and the extraction function unit 15C, as illustrated in FIG. 2.

The collection function unit 15A includes an acquisition unit a generation unit 15b, and a collection unit 15c. Furthermore, the determination function unit 15B includes a calculation unit 15d, the learning unit 15e, and a determination unit 15f. Furthermore, the extraction function unit 15C includes an extraction unit 15g, a learning unit 15e, and the determination unit 15f.

Note that these function units may be implemented in different hardware, respectively or in part. For example, as described above, the collection function unit 15A, the determination function unit 15B, and the extraction function unit 15C may be installed in different hardware as a collection device, a determination device, and an extraction device, respectively. Furthermore, the control unit 15 may include other function units.

Figure 3:
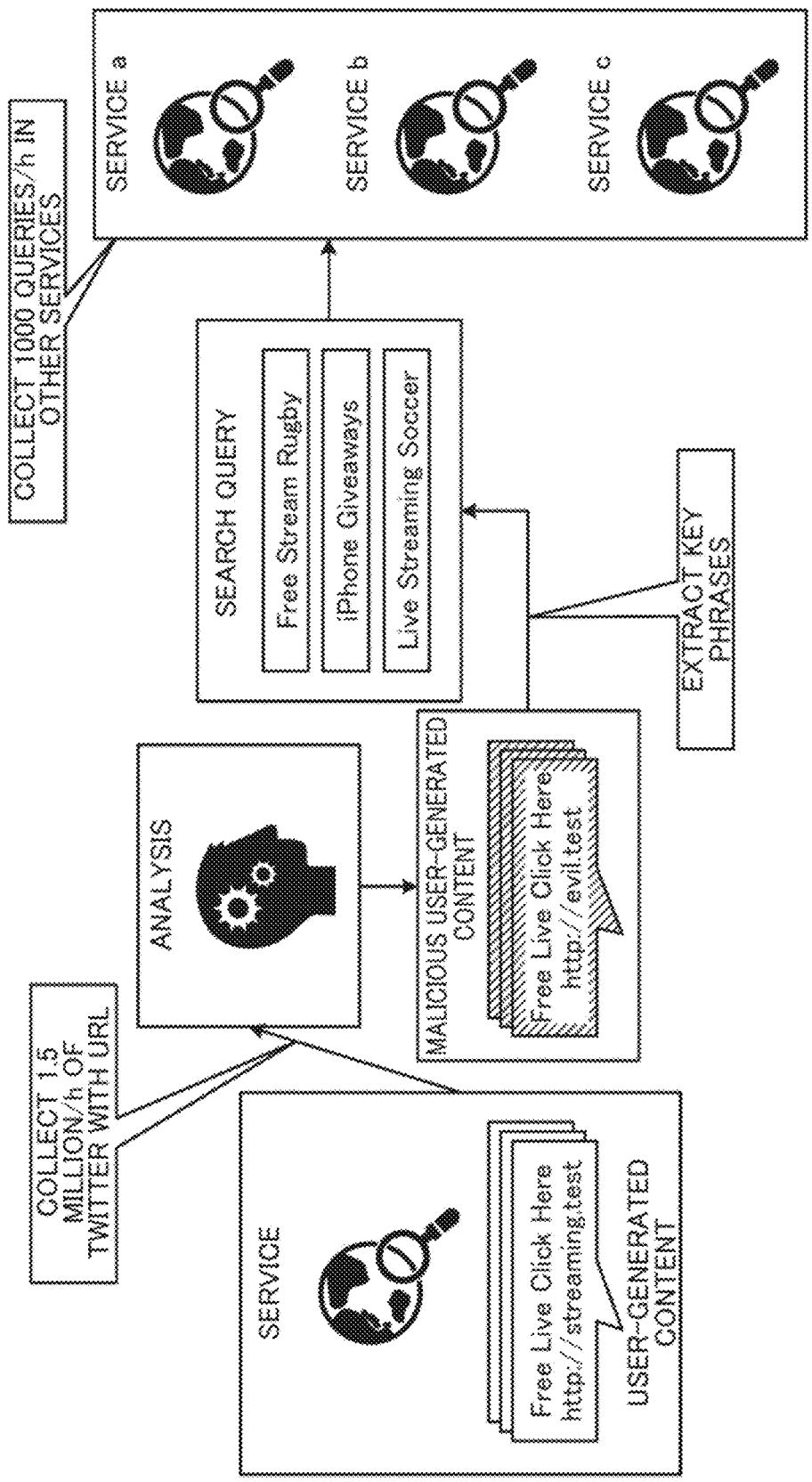
FIG. 3 is a diagram for explaining processing of a collection function unit.

[Collection Function Unit] FIG. 3 is a diagram for explaining the processing of the collection function unit. As shown in FIG. 3, the collection function unit 15A extracts a similar context as a key phrase from a user-generated content group generated at the same time by a certain service and generates a search query. Furthermore, the collection function unit 15A efficiently collects user-generated content of any service having a high possibility of being malignant by using the generated search query of the key phrase having a high possibility of being malignant.

The description will be provided with reference to FIG. 2 again. The acquisition unit 15a acquires user-generated content generated in each service during a predetermined period. Specifically, the acquisition unit 15a acquires user-generated content from the server or the like of each service via the input unit 11 or the communication control unit 13.

For example, the acquisition unit 15a acquires user-generated content in which a URL is described for a predetermined service. At that time, the acquisition unit 15a may acquire the user-generated content periodically at predetermined time intervals or by designating the time posted using the term "since" and the term "until". Furthermore, the acquisition unit 15a may limit and acquire the user-generated content in which the URL is described by using the term "filters". As a result, the acquisition unit 15a can acquire user-generated content in which the URL of the external site is described in real time.

Note that the acquisition unit 15a may store the acquired user-generated content in the storage unit 14, for example, before the processing of the generation unit 15b which will be described later.

The generation unit 15b generates a search query using words which appear in user-generated content for each service. For example, the generation unit 15b generates a search query using a combination of words which appear.

Specifically, the generation unit 15b converts the acquired user-generated content into a characteristic vector having a predetermined number of dimensions. For example, the generation unit 15b uses a vector of distributed representations of words representing a combination of words appearing in each user content as a characteristic vector of the user-generated content in a vector space in which the vocabulary which appears in user-generated content, that is, the total number of words which appear is represented. Furthermore, the generation unit 15b learns a model of distributed representation of words in advance and applies a sentence summarization technique. That is to say, the sentence summarization technique extracts a combination of words in a distributed representation similar to the distributed representation of the entire target sentence (text) as a key phrase.

As a result, the generation unit 15b extracts a key phrase representing the context of each user-generated content. In addition, the generation unit 15b generates a search query for searching for user-generated content including an extracted key phrase.

Specifically, the generation unit 15b calculates similarity between the entire text of the user-generated content and a key phrase candidate in accordance with the following Expression (1). Here, doc is the entire target sentence, C is a key phrase candidate, and K is a set of extracted word combinations (phrases).

[Math. 1]

$$KeyPhrasesScore := \arg_{C_i \in C/K}^{max} \left[ \lambda \cdot \cos_{sim}(C_i, doc) - (1-\lambda)_{C_j \in K}^{max} \cos_{sim}(C_i, C_j) \right] \quad (1)$$

It is possible to extract various key phrases by changing $\lambda$ in the above Expression (1).

For example, the generation unit 15b extracts a combination of words by an n-gram method of extracting n consecutive words from the text. Furthermore, the generation unit 15b calculates a cosine similarity between the entire text of the user-generated content and each phrase of the extracted n-gram by the above Expression (1) and extracts the largest phrase having a calculated similarity value higher than a predetermined threshold value as a key phrase.

Here, FIG. 4 is a diagram for explaining the processing of the generation unit 15b. The generation unit 15b extracts word combinations by 3-gram in the example shown in FIG. 4. In addition, the generation unit 15b calculates the cosine similarity between the entire text of user-generated content "Japan vs United States Free live streaming click here" and 3-gram phrases "japan vs united", "vs united states", "united states free" . . . and extracts key phrases.

Alternatively, the generation unit 15b generates a search query using the frequency of appearance of each word. For example, the generation unit 15b totals a frequency of appearance of the 2-gram phrase and the 3-gram phrase in the text of the user-generated content acquired in a predetermined period. Also, the generation unit 15b extracts a phrase whose frequency of appearance is equal to or higher than a predetermined threshold value as a key phrase and generates a search query for searching for user-generated content including the key phrase.

For example, the generation unit 15b extracts 3-gram phrases from the text of all user-generated content posted every hour for 24 hours on March 1 and calculates the appearance frequency of each phrase. Subsequently, the generation unit 15b extracts a statistically abnormal value (outlier) among the 3-gram phrases that appeared in the user-generated content for 1 hour from 0:00 to 1:00 on March 2, the next day as a key phrase. That is to say, the generation unit 15b uses this phrase as a key phrase when a large amount of user-generated content including a phrase which does not normally appear is posted at a specific timing.

For example, the generation unit 15b calculates a positive outlier using a z-score. In the example shown in FIG. 4, for the phrase "japan vs united", it is assumed that the number of appearances per hour for 24 hours on March 1 is 0, 0, 0, 2, 4, 2, 5, 10, 2, 4, 5, 6, 2, 2, 5, 12, 20, 15, 20, 10, 20, 25, and 30.

An average in this case is 8.792 times and a standard deviation is 8.602.

It is also assumed that this phrase appears 50 times in 1 hour from 0:00 to 1:00 on March 2. A z-score in this case is calculated as Z=(50−8.792)/8.602=4.790. Furthermore, the generation unit 15b uses this phrase "japan vs united" as a key phrase to generate a search query for searching for user-generated content including this key phrase when the outlier threshold value is 1.96 which corresponds to a significant frequency of appearance of 5%.

In addition, the generation unit 15b selects a search query which can be malicious for each service. For example, the generation unit 15b calculates the malignancy of the generated search query on the basis of the search query used for searching for the user-generated content which is most recently determined to be malignant for each service. Also, the generation unit 15b selects a search query whose malignancy is equal to or higher than a predetermined threshold value as the search query of the service.

Here, the generation unit 15b calculates a ratio of the number of user-generated contents determined to be malignant using the number of user-generated content which has been retrieved using this search query as the malignancy of the search query and determined to be malignant or benign in the last 24 hours. Furthermore, the generation unit 15b calculates an average value of the malignancy of each word of the key phrase as the malignancy of the detection query.

For example, it is assumed that the number of malicious user-generated contents retrieved using the search query of the key phrase "rugby world cup streaming" is 20 and the number of benign user-generated contents is 50 in a service which has been performed in the last 24 hours. Furthermore, it is assumed that the number of malicious user-generated contents retrieved using the search query of the key phrase "free live streaming" is 100 and the number of benign user-generated contents is 100. Furthermore, it is assumed that the number of malicious user-generated contents retrieved using the search query of the key phrase "rugby japan vs korea" is 10 and the number of benign user-generated contents is 100.

In this case, the malignancy of the word "japan" is $\alpha=10/(10+100)$. The malignancy of the word "rugby" is $\beta=\{20/(20+50)+10/(10+100)\}/2$. Furthermore, the malignancy of the word "streaming" is $\gamma=\{20/(20+50)+100/(100+100)\}/2$.

Therefore, the malignancy score of the search query of the key phrase "japan rugby streaming" is calculated as $(\alpha+\beta+\gamma)/3=0.225$.

In this way, the generation unit 15b calculates the malignancy of the search query for each service and selects a search query whose calculated malignancy is equal to or higher than the threshold value as a search query for user-generated content which can be malignant for the service.

A collection unit 15c collects user-generated content generated in a plurality of services by using the generated search query. For example, the collection unit 15c collects user-generated content of another service by using a search query generated by user-generated content of one service. In addition, the collection unit 15c also collects a plurality of types of user-generated content in each service together with the generated date and time using the same search query.

For example, the collection unit 15c applies the same search query to three types of collection URLs for a service a in which user-generated content for sentence posting, video posting, and event notification is generated and collects each of the three types of user-generated content together with the date and time at which the content is posted (generated). In addition, the same search query is applied to a common collection URL for a service b which generates user-generated content for video posting and video distribution and two types of user-generated content are collected together with the date and time at which they are posted.

As a result, the collection unit 15c can efficiently collect user-generated content spreading in a context similar to a specific timing. Particularly, the collection unit 15c can easily and quickly collect user-generated content which is highly likely to be malignant for each service by using the search query which can be malignant selected by the generation unit 15b.

Note that the collection unit 15c collects user-generated content by setting an upper limit on the collection amount, for example, 100 queries per hour. This makes it possible to reduce the load on the server of each service which is the collection destination.

Figure 5:
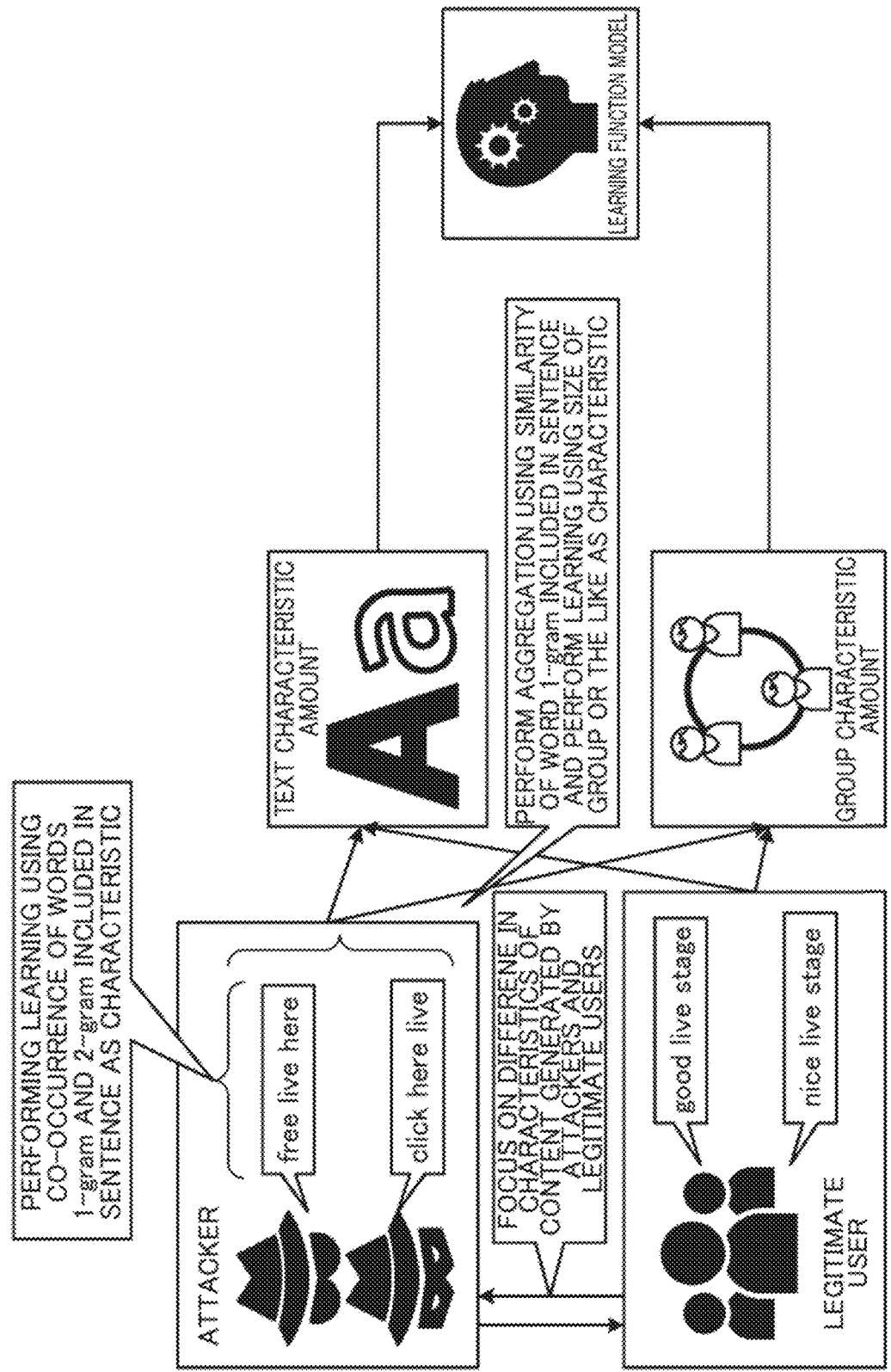
FIG. 5 is a diagram for explaining processing of a determination function unit.

[Determination Function Unit] FIG. 5 is a diagram for explaining the processing of the determination function unit. As shown in FIG. 5, the determination function unit 15B acquires a machine learning model representing each characteristic amount by performing learning using a difference in characteristics between the user-generated content generated by the attacker and the user-generated content generated by the legitimate user for a specific service. The determination function unit 15B learns the machine learning model using aa text characteristic amount which represents the co-occurrence of phrases in user-generated content and a group characteristic amount which represents the similarity of words which appear in each user-generated content as a characteristic amount.

As a result, the determination function unit 15B can determine whether the user-generated content of the service generated after that is malicious by using the learned machine learning model. For example, the determination function unit 15B can perform malicious determination of a large amount of user-generated content of a specific service generated at the same time in real time.

The description will be provided with reference to FIG. 2 again. The calculation unit 15d calculates the characteristic amount of the user-generated content generated by the user in the predetermined service in the predetermined period. In the embodiment, the characteristic amount of the user-generated content includes a text characteristic amount which represents the characteristics of a combination of words which co-occur in a plurality of user-generated content and a group characteristic amount which represents the characteristics relating to word similarity between a plurality of user-generated content generated in a predetermined period.

Here, FIGS. 6 to 9 are diagrams for explaining the processing of the calculation unit. First, the calculation unit 15d calculates a text characteristic amount which represents a characteristic of a combination of words co-occurring in a plurality of user-generated contents. Specifically, the calculation unit 15d calculates the text characteristic amount of the set of user-generated content using an optimized word distributed representation model for each of the phrases which co-occur in the collected set of user-generated content.

Figure 6:
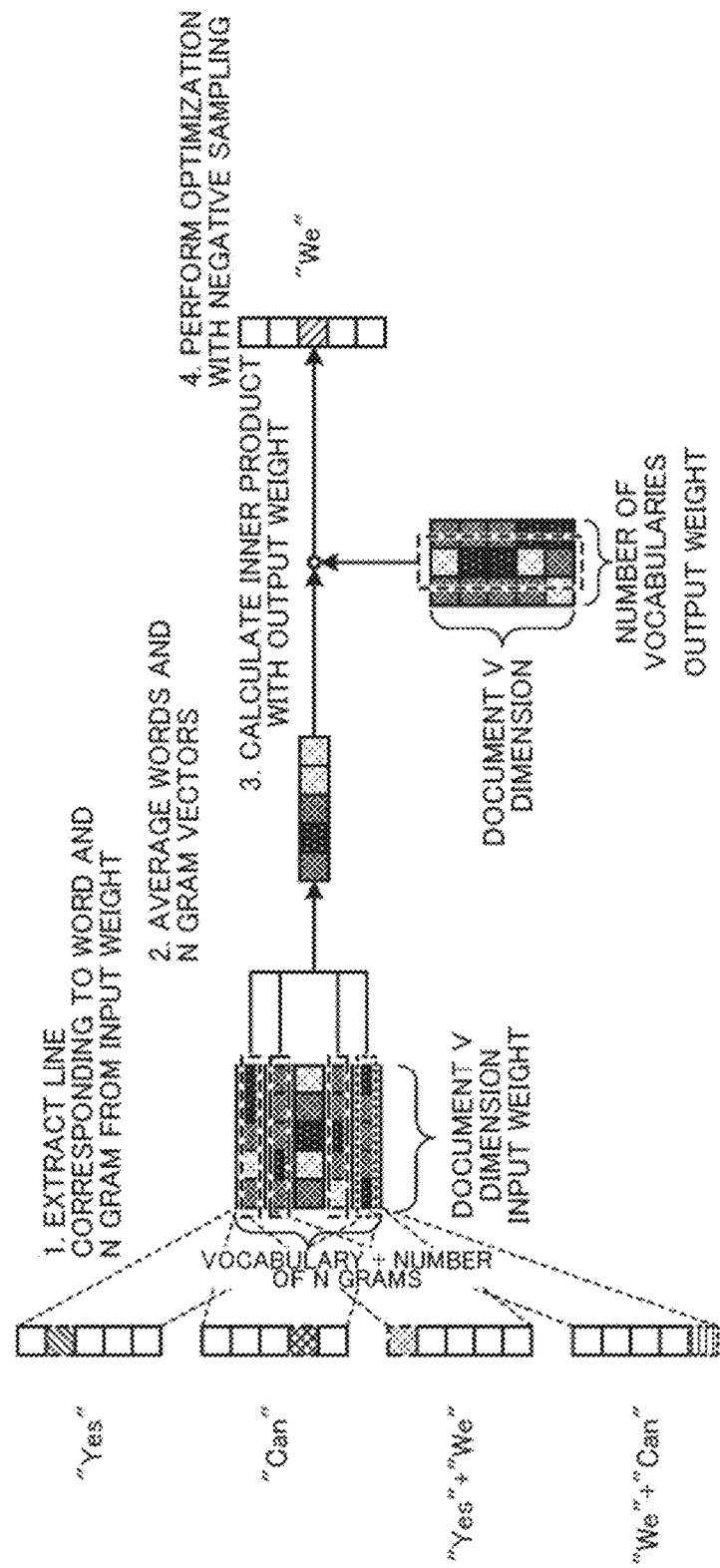
FIG. 6 is a diagram for explaining processing of a calculation unit.

More specifically, the calculation unit 15d optimizes the model for outputting the characteristic vector of the distributed representation by the phrase co-occurring in each user-generated content of the set of user-generated content in advance, as shown in FIG. 6. In the example shown in FIG. 6, the calculation unit 15d uses a matrix (refer to 1.) in which each user-generated content (document) is set as each column as an input weight using a word (1-gram phrase) and 2-gram phrase which appear in a set of malicious user-generated content as each line. Furthermore, the calculation unit 15d calculates an average of each line corresponding to each phrase (refer to 2.).

Furthermore, the calculation unit 15d calculates an inner product by using a matrix in which each document is in each line and each word is in each column as the output weight (refer to 3.) and optimizes a model in which a characteristic vector of the distributed representation of each phrase is output (refer to 4.).

Also, the calculation unit 15d first extracts a word existing in the dictionary from the character string of the URL in the content with respect to the set U of the collected user-generated content and replaces it with the character string of the URL (WordSegmentation), as shown in FIG. 7.

Furthermore, the calculation unit 15d optimizes the distributed representation model for the words (1-gram phrases) and 2-gram phrases which appear in the set U of the user-generated contents in advance, as shown in FIG. 6. Furthermore, the calculation unit 15d generates a set of characteristic vectors $VEC_u$ of each user-generated content u using the optimized model of distributed representation (Word Embeddings). In addition, the calculation unit 15d calculates an average of the characteristic vector $VEC_u$ of each user-generated content u as the text characteristic amount of the set of user-generated content.

Here, there is a tendency for many similar words to exist in malicious user-generated content also in events at different timings. Therefore, for the set U of malicious user-generated content, the average of the characteristic vector $VEC_u$ of each user-generated content u calculated as described above can be a characteristic amount which reflects the characteristics of the set U of user-generated content.

Furthermore, the calculation unit 15d calculates a group characteristic amount which represents a characteristic relating to the similarity of words between a plurality of user-generated contents generated in a predetermined period. Specifically, as shown in FIG. 8, the calculation unit 15*d* calculates the similarity between the user-generated contents by applying the Minhash-LSH algorithm to the words (1-gram phrases) which appear for the set U of user-generated content collected at the same time. Here, the same period means that a time difference between the generated dates and times is within a predetermined time threshold value σ. Furthermore, the calculation unit 15*d* sets this set of user-generated content as a set of similar user-generated content when the calculated similarity exceeds the predetermined similarity threshold value τ.

The calculation unit 15*d* specifies a group characteristic amount for a similar user-generated content set. The group characteristic amount includes a size of a set, the number of users in the set, the number of unique URLs described in the set, the average number of URLs described in the user-generated content in the set, or the average posting time interval in the set.

For example, the calculation unit 15*d* determines whether the collected user-generated content set is a similar user-generated content set, and when it is a similar user-generated content set, specifies the group characteristic amount, as illustrated in FIG. 9.

FIG. 9 illustrates, for example, that the user-generated content 1 is generated by user1 and the appearing word is "Free live streaming URL1 URL1". Furthermore, it is exemplified that the user-generated contents 1 to 3 are the same set of similar user-generated contents. Furthermore, it is exemplified as the group characteristic amount of this similar user-generated content set that the average posting time interval and the set size are 3, the number of unique users of the set is 2 (user1, user2), the number of URL uniques of the set is 2 (URL1, URL2), and the average number of URLs of one content is 1.67.

Furthermore, it is exemplified that the user-generated contents 4 and 5 are the same set of similar user-generated contents. Furthermore, it is exemplified that the user-generated contents 6 and 7 are not a set of similar user-generated contents.

Here, malicious user-generated content tends to spread at the same time in a similar context. Therefore, it is possible to specify the group characteristic amount as described above for the malicious user-generated content set. That is, it means that there is a high possibility that this set of user-generated content is malicious when the group characteristic amount can be specified in this way.

The description will be provided with reference to FIG. 2 again. The learning unit 15*e* performs learning using the calculated characteristic amount of the user-generated content generated by the legitimate user and the characteristic amount of the content generated by the malicious user. Furthermore, the determination unit 15*f* determines whether the user-generated content is generated by a malicious user using the learned model.

Specifically, the learning unit 15*e* performs supervised learning of a machine learning model using the text characteristic amount which represents the co-occurrence of phrases in user-generated content and a group characteristic amount which represents the similarity of words which appear in each user-generated content. Furthermore, the determination unit 15*f* uses the learned machine learning model to determine whether the user-generated content of the service acquired after that is malicious.

In this way, the determination function unit 15B can learn the characteristics of user-generated content which is highly likely to be malignant and is generated at a specific timing such as an event and perform a malicious determination of the user-generated content collected in real time by using the learning result.

Figure 10:
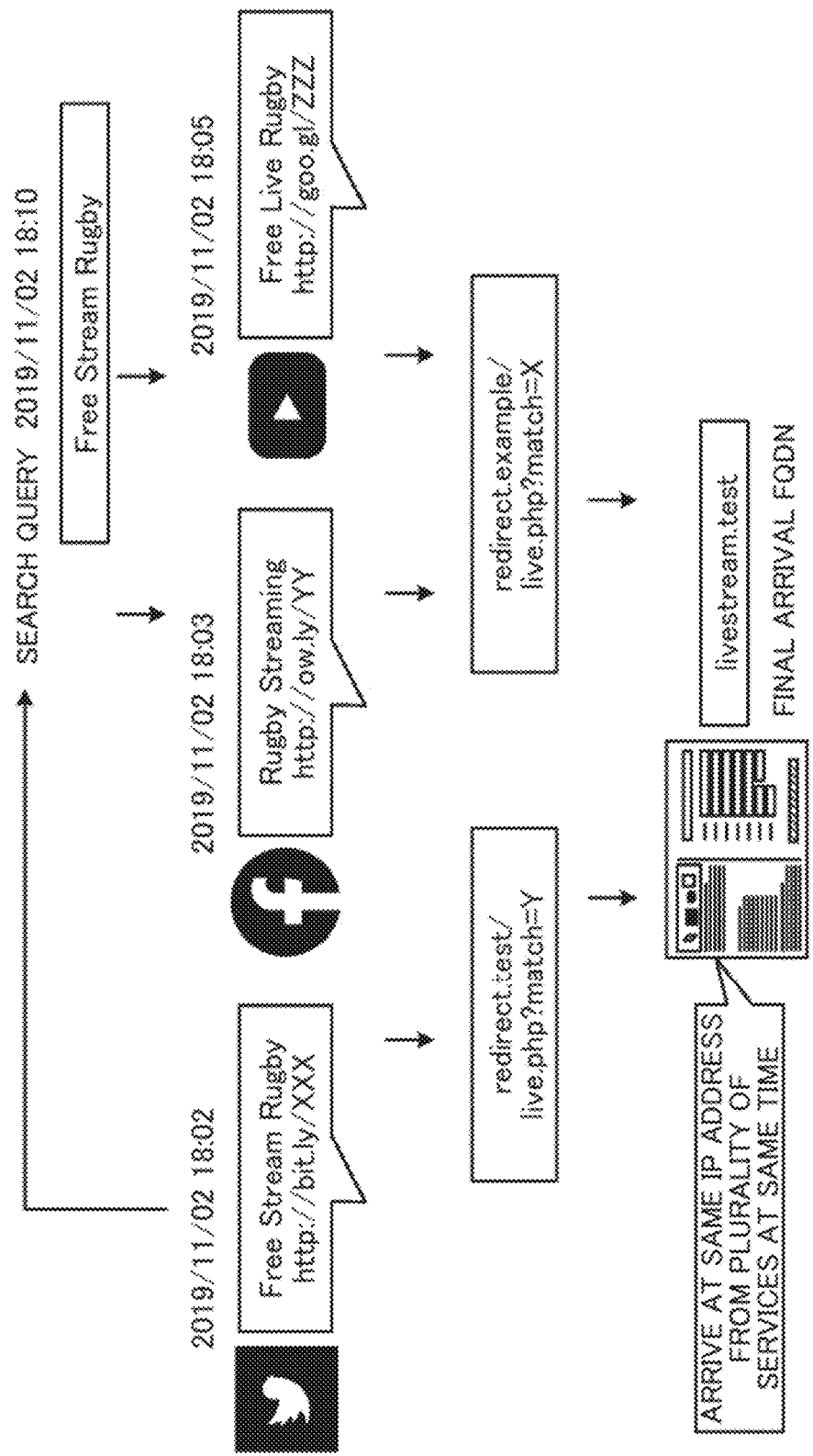
FIG. 10 is a diagram for explaining processing of an extraction function unit.

[Extraction Function Unit] FIG. 10 is a diagram for explaining the processing of the extraction function unit. As shown in FIG. 10, the extraction function unit 15C extracts a characteristic amount of the Web content obtained by accessing the URL included in the user-generated content in an arbitrary service. For example, the extraction function unit 15C identifies an IP address of a fully qualified domain name (FQDN) at which it will finally arrive.

Furthermore, the extraction function unit 15C learns the user-generated content generated by the attacker and the user-generated content generated by the legitimate user by using the characteristic amount. In addition, the extraction function unit 15C uses the learned characteristic amount to perform a malicious determination on user-generated content generated in large quantities by an arbitrary service at the same time.

In addition, the extraction function unit 15C extracts threat information, which is a characteristic that can be a threat, from this malicious user-generated content, and outputs a threat report when it is determined that the content is malicious user-generated content. In this way, the extraction function unit 15C can detect an attack which can be a threat in real time.

The description will be provided with reference to FIG. 2 again. The extraction unit 15*g* accesses the entrance URL described in the user-generated content generated by the user in a plurality of services in a predetermined period and extracts the characteristic amount of the user-generated content. The characteristic amount extracted herein includes a characteristic amount relating to the Web content of the arrival website and a characteristic amount relating to a plurality of user-generated contents generated in a predetermined period.

Specifically, the extraction unit 15*g* first accesses the entrance URL using the URL described in the collected user-generated content as the entrance URL and identifies the URL of the site finally reached, that is, the arrival URL. Note that, when the entrance URL uses the URL shortening service, this is used as the entrance URL as it is.

Here, the URL described in the user-generated content includes a plurality of URLs using a URL shortening service such as bit[.]ly and tinyuri[.]com. The URL shortening service is a service which converts a long URL into a short and simple URL and issues it. Many URL shortening services redirect to the original long URL by associating the long URL of another site with the short URL issued under the control of the own service when it accesses this short URL.

Therefore, the extraction unit 15*g* creates a Web crawler by combining, for example, Scrapy, which is a scraping framework, and Splash, a headless browser capable of rendering Javascript®. Thus, the extraction unit 15*g* accesses the URL described in the user-generated content and records the communication information.

For example, the extraction unit 15*g* records the Web content of the website at which it finally arrives and the number of redirects. The number of redirects is 2 times and the Web contents of the final arrival website "malicious-.com" are recorded in the case of a communication pattern in which transition is performed in this order of entrance URL "bit.ly/aaa"→"redirect.com/"→arrival URL "malicious.com".

Furthermore, the extraction unit 15*g* extracts the characteristic amount of the Web content such as the number of tags for each HTML of the arrival site, distributed representation of the character string displayed in the arrival site, the number of redirects, and the number of a fully specified domain name (FQDN) transitioning from the entrance URL to the arrival URL. Here, the extraction unit 15g can extract the characteristic amount of the malicious user-generated content by using the tag recorded by HTML as the tag of Top30 which frequently appears in malicious sites.

Furthermore, the extraction unit 15g identifies the IP address of the FQDN at which it will finally arrive. In addition, the set of these user-generated contents is referred to as a similar user-generated content set when the extraction unit 15g reaches the same IP address from a plurality of services at the same time.

Also, the extraction unit 15g extracts the characteristic amount of the user-generated content such as the number of user-generated contents, the number of services, the number of entrance URLs, the number of users, the distributed representation of text, and the like for the set of similar user-generated contents.

The learning unit 15e performs learning using the characteristic amount of the user-generated content generated by the extracted legitimate user and the characteristic amount of the content generated by the malicious user. Furthermore, the determination unit 15f determines whether the user-generated content is generated by a malicious user using the learned model.

Specifically, the learning unit 15e performs supervised learning of a machine learning model using the characteristic amount relating to the Web content of the extracted final arrival website and the characteristic amount relating to the user-generated content generated at the same time. Furthermore, the determination unit 15f uses the learned machine learning model to determine whether the user-generated content of the service acquired after that is malicious.

In this way, the learning unit 15e learns the characteristics of a user-generated content set which is generated in a similar context at a specific timing such as an event and has a URL in which it arrives at the same IP address and which is highly likely to be malignant. Therefore, the determination unit 15f can use the learning result to perform determine the malicious determination of the user-generated content collected in real time.

Figure 12:
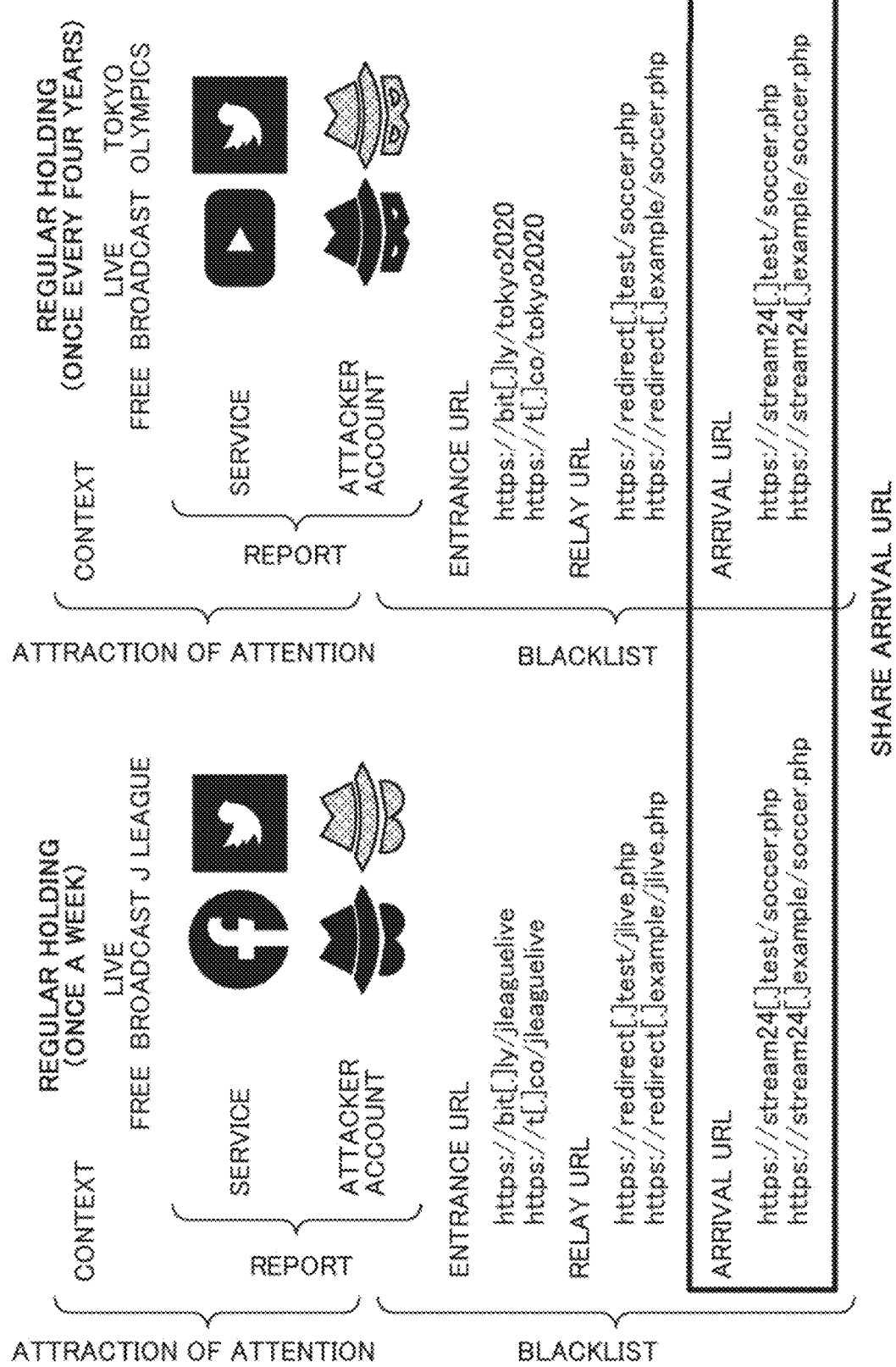
FIG. 12 is a diagram for explaining threat information.

Further, the extraction unit 15g outputs the attack characteristics of the user-generated content as threat information when it is determined that the user-generated content is generated by a malicious user. Here, FIGS. 11 and 12 are diagrams for explaining threat information. The threat information includes, for example, a key phrase included in user-generated content, an entrance URL, an arrival URL, and the like described in the user-generated content of each service as shown in FIG. 11. User-generated content of service a and service b including the key phrase "rugby world cup", the entrance URL described in each, and the arrival URL common to services a and b are shown in the example shown in FIG. 11. The extraction unit 15g outputs the threat information to a predetermined provider via the output unit 12 or the communication control unit 13.

Specifically, as shown in FIG. 12, as threat information, an attraction of attention such as a report to a provider, a blacklist, or the like is provided. In the example shown in FIG. 12, attention is attracted to user-generated content in the context including, for example, the words "regular holding (once a week), free, live broadcasting, J-League" and the like. Particularly, attacker accounts and abused services which use this context have been reported. Furthermore, a blacklist including an entrance URL described in the user-generated content, a relay URL transitioning from the entrance URL, and an arrival URL at which it finally arrives from the relay URL is presented.

Furthermore, the fact that arrival URLs of malicious user-generated content in the above context and malicious user-generated content in the context including the words "regular holding (once every four years), free, live broadcasting, Tokyo Olympics", and the like are a common malicious site is presented in the example shown in FIG. 12.

In this way, the extraction function unit 15C performs a malicious determination using the characteristic amount obtained by accessing the entrance URL for user-generated content having a high possibility of malignancy generated in large quantities by any service at the same time. Further, the extraction function unit 15C extracts threat information from the malicious user-generated content and outputs a threat report when the extraction function unit 15C determines that the content is malicious user-generated content. Thus, the extraction function unit 15C can perform detecting in real time an attack which can be a threat among the user-generated content having a high possibility of malignancy generated in large quantities by any service at the same time and output the attack information.

Note that the extraction unit 15g may output attack characteristics such as character strings and URLs included in the guidance context of the user-generated content as threat information when the above-mentioned determination function unit 15B determines that the content is malicious user-generated content.

Figure 13:
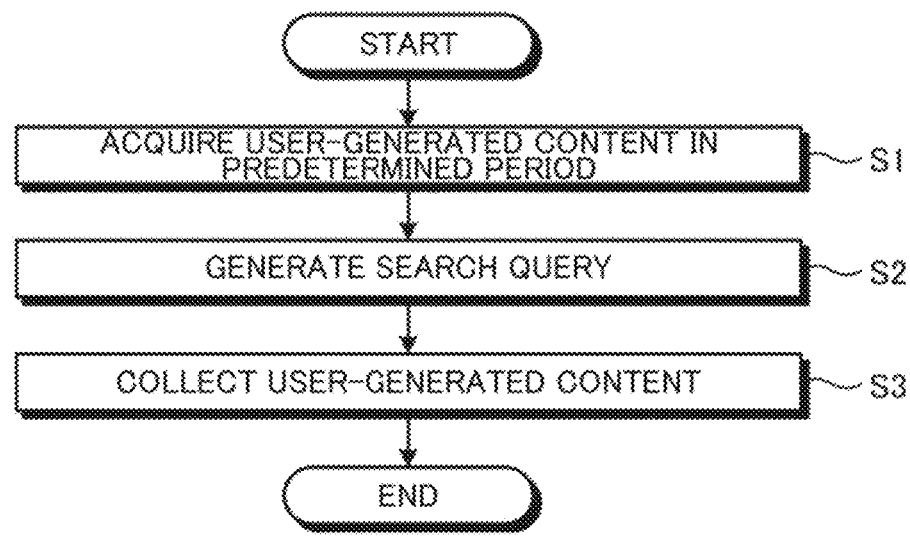
FIG. 13 is a flowchart for describing a processing procedure of the collection function unit.

[Detection Process] Subsequently, the detection process using the detection device 1 according to the embodiment will be described with reference to FIGS. 13 to 17. First, FIG. 13 is a flowchart for describing a collection processing procedure of the collection function unit. The flowchart of FIG. 13 is started, for example, at the timing at which the user inputs an operation instructing the start.

First, the acquisition unit 15a acquires user-generated content generated in each service during a predetermined period (Step S1). Specifically, the acquisition unit 15a acquires user-generated content from the server or the like of each service via the input unit 11 or the communication control unit 13.

Subsequently, the generation unit 15b generates a search query using words which appear in the user-generated content for each service. For example, the generation unit 15b generates a search query using a combination of words that appear (Step S2).

Furthermore, the generation unit 15b calculates the malignancy of the search query for each service and selects a search query whose calculated malignancy is equal to or higher than the threshold value as a search query for user-generated content which can be malignant for the service.

The collection unit 15c collects user-generated content generated in a predetermined service by using the selected search query (Step S3). Thus, a series of collection processes ends.

Figure 14:
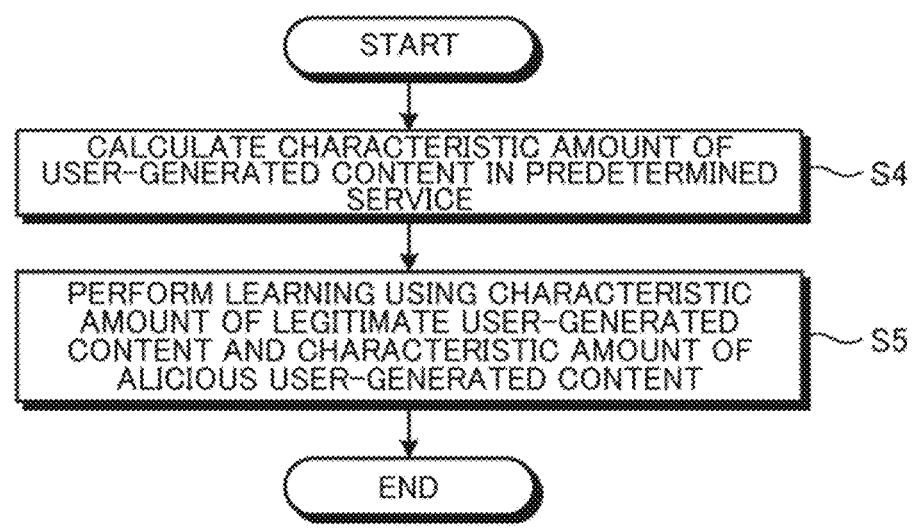
FIG. 14 is a flowchart for describing a processing procedure of the determination function unit.
Figure 15:
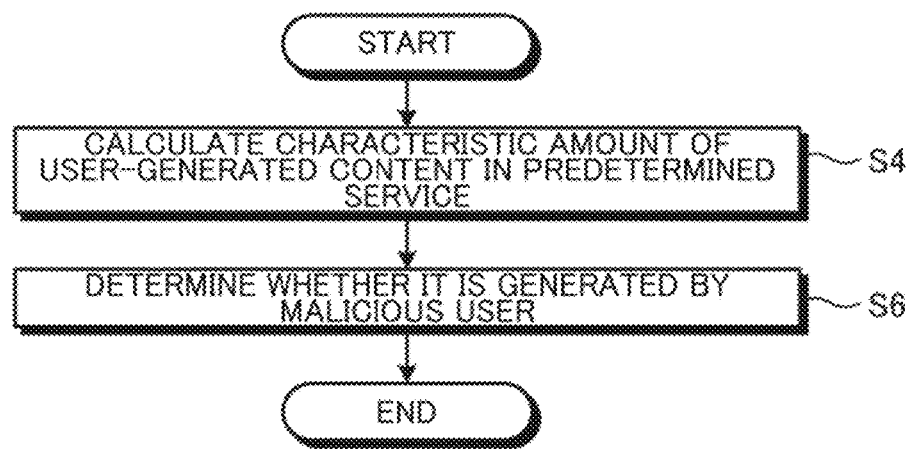
FIG. 15 is a flowchart for describing a processing procedure of the determination function unit.

Subsequently, FIGS. 14 and 15 are flowcharts for describing the processing procedure of the determination function unit. First, the flowchart of FIG. 14 shows the learning process in the determination function unit 15B and is started at the timing at which, for example, the user inputs an operation instructing the start.

The calculation unit 15d calculates the characteristic amount of the user-generated content of the predetermined service collected by the collection function unit 15A in the predetermined period (Step S4). Specifically, the calculation unit 15*d* calculates a text characteristic amount which represents a characteristic of a combination of words co-occurring in a plurality of user-generated contents and a group characteristic amount which represents a characteristic relating to word similarity between a plurality of user-generated content generated in a predetermined period.

Furthermore, the learning unit 15*e* performs learning using the calculated characteristic amount of the user-generated content generated by the legitimate user and the characteristic amount of the content generated by the malicious user (Step S5). Thus, a series of learning processes ends.

Subsequently, the flowchart of FIG. 15 shows the determination process in the determination function unit 15B and is started at the timing at which, for example, the user inputs an operation instructing the start.

The calculation unit 15*d* calculates the characteristic amount of the user-generated content of the predetermined service collected by the collection function unit 15A in the predetermined period (Step S4).

Subsequently, the determination unit 15*f* determines whether the user-generated content is generated by a malicious user using the learned model (Step S6). Thus, a series of determination processes ends.

Figure 16:
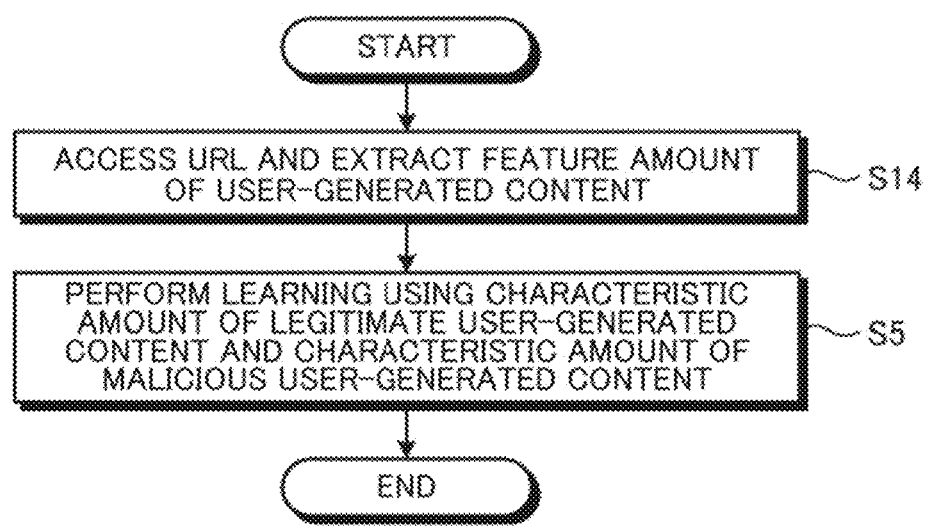
FIG. 16 is a flowchart for describing a processing procedure of the extraction function unit.
Figure 17:
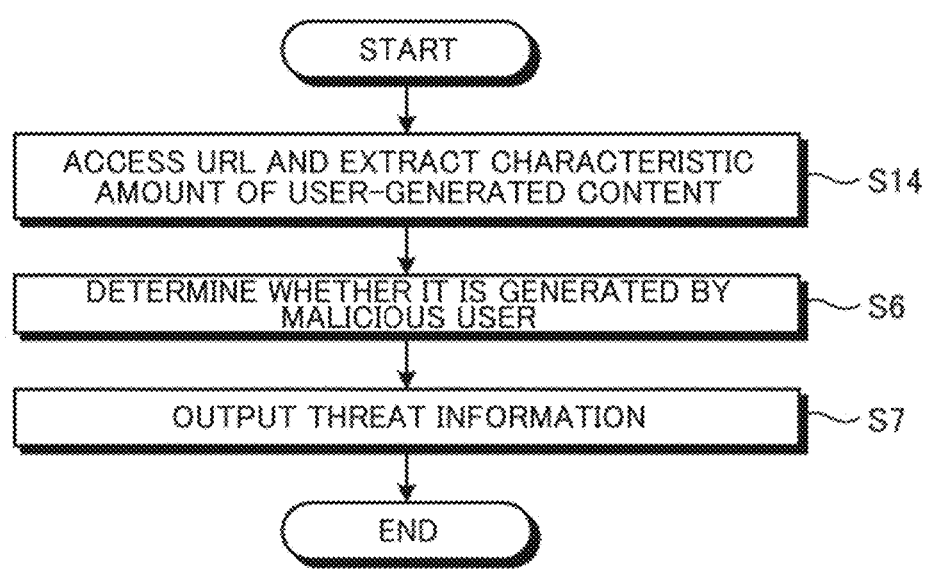
FIG. 17 is a flowchart for describing a processing procedure of the extraction function unit.

Furthermore, FIGS. 16 and 17 are flowcharts for describing the processing procedure of the extraction function unit. First, the flowchart of FIG. 16 shows the learning process in the extraction function unit 15C and is started at the timing at which, for example, the user inputs an operation instructing the start.

First, the extraction unit 15*g* accesses the entrance URL described in the user-generated content of a plurality of services collected by the collection function unit 15A in a predetermined period and extracts the characteristic amount of the user-generated content (Step S14). Specifically, the extraction unit 15*g* extracts the characteristic amount relating to the Web content of the arrival website and the characteristic amount relating to the plurality of user-generated contents generated in a predetermined period.

Furthermore, the learning unit 15*e* performs learning using the characteristic amount of the user-generated content generated by the extracted legitimate user and the characteristic amount of the content generated by the malicious user (Step S5). Thus, a series of learning processes ends.

Subsequently, the flowchart of FIG. 17 shows the determination process in the extraction function unit 15C and is started at the timing at which, for example, the user inputs an operation instructing the start.

(Processing in the Phase Adjustment Unit According to the First Embodiment)

First, the extraction unit 15*g* accesses the entrance URL described in the user-generated content of a plurality of services collected by the collection function unit 15A in a predetermined period and extracts the characteristic amount of the user-generated content (Step S14).

Furthermore, the determination unit 15*f* determines whether the user-generated content is generated by a malicious user using the learned model (Step S6).

Also, the extraction unit 15*g* outputs the attack characteristics of the user-generated content as threat information when the determination unit 15*f* determines that the user-generated content is generated by a malicious user (Step S7). Thus, a series of determination processes ends Note that the process of Step S7 may be performed after the process of Step S6 shown in FIG. 15, as in the process of FIG. 17. That is to say, the extraction unit 15*g* may output the attack characteristics of the user-generated content as threat information when the determination function unit 15B determines that the user-generated content is generated by a malicious user.

As described above, in the collection function unit 15A of the embodiment, the acquisition unit 15*a* acquires the user-generated content generated in each service during a predetermined period. In addition, the generation unit 15*b* generates a search query using words which appear in user-generated content for each service. In addition, the collection unit 15*c* collects user-generated content generated in a plurality of services by using the generated search query.

Thus, the collection function unit 15A can efficiently collect user-generated content having a high possibility of malignancy, which spreads in a context similar to a specific timing. As a result, the detection device 1 can detect a malicious site in a wide range quickly and with high accuracy.

In addition, the generation unit 15*b* selects a search query that can be malicious for each service. Thus, the collection function unit 15A can easily and quickly collect user-generated content having a high possibility of being malicious for each service.

Furthermore, in the determination function unit 15B, the calculation unit 15*d* calculates the characteristic amount of the user-generated content generated by the user in a predetermined period. Furthermore, the learning unit 15*e* performs learning using the calculated characteristic amount of the user-generated content generated by the legitimate user and the characteristic amount of the content generated by the malicious user. Furthermore, the determination unit 15*f* determines whether the user-generated content is generated by a malicious user using the learned model.

Thus, the determination function unit 15B can learn the characteristics of the user-generated content generated at a specific timing such as an event and use the learning result to perform a malicious determination of the user-generated content collected in real time. In this way, the determination function unit 15B can detect the malicious site quickly and accurately.

Furthermore, the characteristic amount of the user-generated content calculated by the calculation unit 15*d* includes a text characteristic amount which represents a characteristic of a combination of words co-occurring in a plurality of user-generated contents and a group characteristic amount which represents a characteristic relating to word similarity between a plurality user-generated content generated in a predetermined period.

Thus, the determination function unit 15B can perform learning by using the characteristics of the user-generated content having a high possibility of malignancy and can perform the malicious determination of the user-generated content collected in real time by using the learning result.

Furthermore, in the extraction function unit 15C, the extraction unit 15*g* accesses the entrance URL described in the user-generated content generated by the user in a plurality of services during a predetermined period and extracts the characteristic amount of the user-generated content. Furthermore, the learning unit 15*e* performs learning using the characteristic amount of the user-generated content generated by the extracted legitimate user and the characteristic amount of the content generated by the malicious user. Furthermore, the determination unit 15*f* determines whether the user-generated content is generated by a malicious user using the learned model.

Thus, the extraction function unit 15C can perform malicious determination of user-generated content collected in real time by using the characteristics of user-generated content of various services generated at specific timings such as events. As described above, the extraction function unit 15C can detect a malicious site in a wide range quickly and with high accuracy.

Furthermore, the characteristic amount extracted by the extraction unit 15g includes a characteristic amount relating to the Web content of the arrival website and a characteristic amount relating to a plurality of user-generated contents generated in a predetermined period. Thus, the extraction function unit 15C can extract effective threat information of malicious sites.

Furthermore, the extraction unit 15g outputs the attack characteristics of the user-generated content as threat information when it is determined that user-generated content is generated by a malicious user. Thus, the extraction function unit 15C can present effective threat information of a malicious site to a predetermined provider.

Furthermore, in the detection device 1 of the embodiment, the acquisition unit 15a acquires user-generated content generated in each service in a predetermined period. In addition, the generation unit 15b generates a search query using words which appear in user-generated content for each service. In addition, the collection unit 15c collects user-generated content generated in a plurality of services by using the generated search query. In addition, the calculation unit 15d calculates the characteristic amount of the collected user-generated content of the predetermined service. Furthermore, the learning unit 15e performs learning using the characteristic amount of the user-generated content generated by the legitimate user and the characteristic amount of the content generated by the malicious user. Furthermore, the determination unit 15f determines whether the user-generated content is generated by a malicious user using the learned model. Furthermore, the extraction unit 15g accesses the entrance URL described in the user-generated content and outputs the attack characteristics of the user-generated content as threat information when it is determined that user-generated content is generated by a malicious user.

Thus, the detection device 1 can quickly detect malicious user-generated content by using the characteristics of user-generated content generated at a specific timing such as an event and present effective threat information of a malicious site to a predetermined provider. In this way, the detection device 1 can quickly detect a malicious site in a wide range.

In addition, the generation unit 15b selects a search query which can be malicious for each service. Thus, the detection device 1 can easily collect user-generated content having a high possibility of malignancy and detect malicious user-generated content more quickly.

Furthermore, the characteristic amount of the user-generated content calculated by the calculation unit 15d includes a text characteristic amount which represents a characteristic of a combination of words co-occurring in a plurality of user-generated contents and a group characteristic amount which represents a characteristic relating to word similarity between a plurality of user-generated content generated in a predetermined period. Thus, the detection device 1 can detect malicious user-generated content more quickly by targeting user-generated content having a high possibility of malignancy.

Furthermore, the learning unit 15e performs learning using the characteristic amount of the user-generated content of the plurality of services extracted by the extraction unit 15g and the determination unit 15f determines whether the user-generated content of the plurality of services is generated by a malicious user using the learned model. Thus, it is possible to detect malicious user-generated content more quickly using the characteristics of user-generated content of any service.

Furthermore, the characteristic amount extracted by the extraction unit 15g includes a characteristic amount relating to the Web content of the arrival website and a characteristic amount relating to a plurality of user-generated contents generated in a predetermined period. Thus, the detection device 1 can present effective threat information of a malicious site to a predetermined provider.

[Program] It is also possible to create a program in which the processing executed by the detection device 1 according to the above embodiment is described in a language which can be executed by a computer. As one embodiment, the detection device 1 can be implemented by installing a detection program which executes the above detection process as package software or online software on a desired computer. For example, the information processing device can be constituted to function as the detection device 1 by causing the information processing device to execute the above detection program. The information processing device mentioned herein includes a desktop type or notebook type personal computer. In addition, information processing devices include smartphones, mobile communication terminals such as mobile phones and personal handyphone systems (PHSs), and slate terminals such as personal digital assistants (PDAs). Furthermore, the function of the detection device 1 may be implemented in the cloud server.

Figure 18:
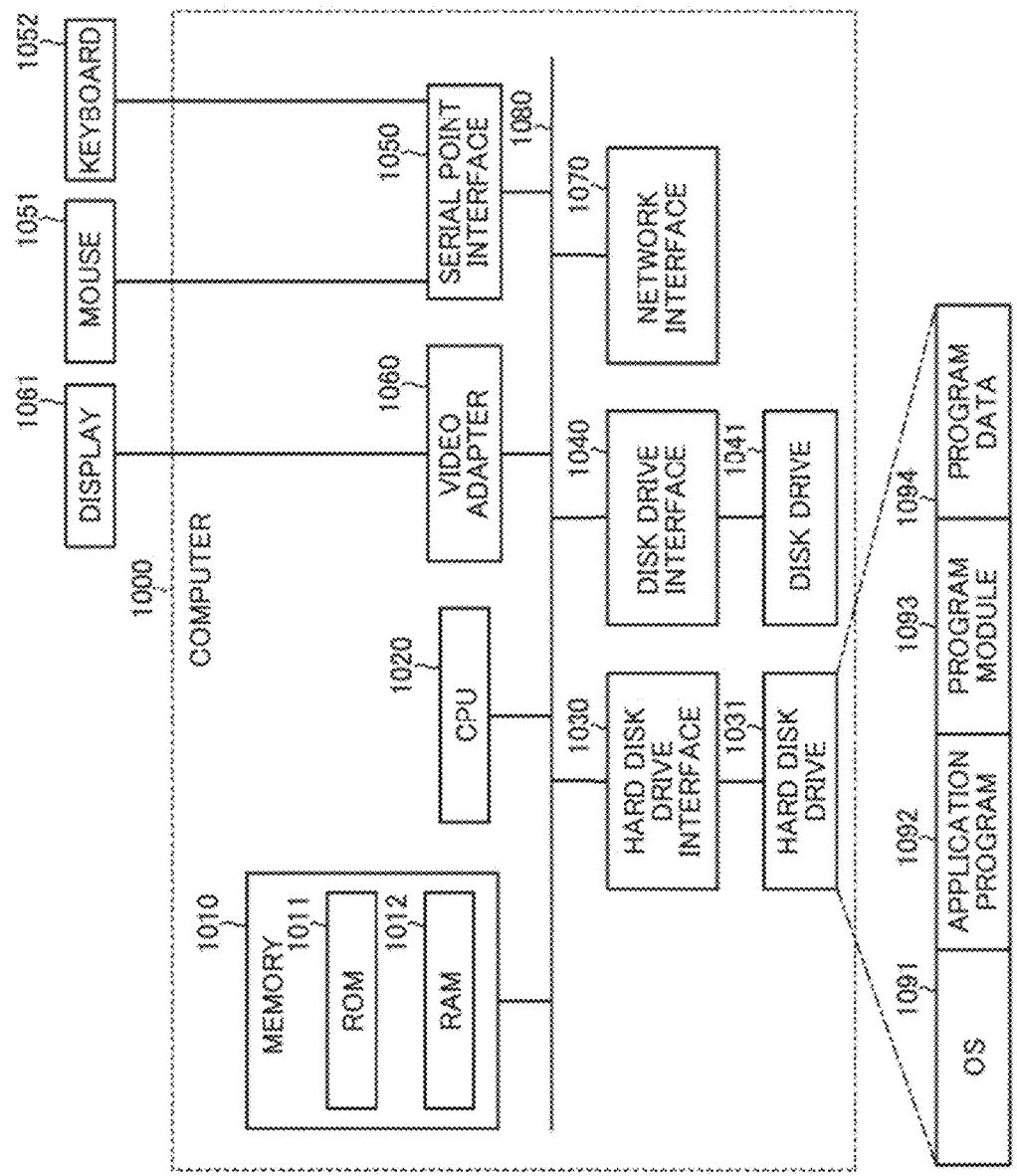
FIG. 18 is a diagram showing an example of a computer which executes a detection program.

FIG. 18 is a diagram showing an example of a computer which executes a detection program. A computer 1000 has, for example, a memory 1010, a CPU 1020, a hard disk drive interface 1030, a disk drive interface 1040, a serial port interface 1050, a video adapter 1060, and a network interface 1070. Each of these units is connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to the hard disk drive 1031. The disk drive interface 1040 is connected to the disk drive 1041. A removable storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each of the information described in the above embodiment is stored in, for example, the hard disk drive 1031 or the memory 1010.

Furthermore, the detection program is stored in the hard disk drive 1031 as, for example, a program module 1093 in which a command executed by the computer 1000 is described. Specifically, the program module 1093 in which each process performed by the detection device 1 described in the above embodiment is described is stored in the hard disk drive 1031.

Furthermore, the data used for information processing by the detection program is stored as program data 1094 in, for example, the hard disk drive 1031. Also, the CPU 1020 reads the program module 1093 and the program data 1094 stored in the hard disk drive 1031 into the RAM 1012 as needed and performs each of the above-mentioned procedures.

Note that the program module 1093 and the program data 1094 relating to the detection program are not limited to those stored in the hard disk drive 1031 and may be stored in, for example, a removable storage medium and be read by the CPU 1020 via the disk drive 1041 or the like. Alternatively, the program module 1093 and the program data 1094 relating to the detection program may be stored in another computer connected via a network such as a LAN or a wide area network (WAN) and be read by the CPU 1020 via the network interface 1070.

Although the embodiment to which the invention made by the present inventor is applied has been described above, the present invention is not limited by the description and the drawings which form a part of the disclosure of the present invention according to the present embodiment. That is to say, other embodiments, examples, operational techniques, and the like made by those skilled in the art on the basis of the present embodiment are all included in the scope of the present invention.

REFERENCE SIGNS LIST

1 Detection device
11 Input unit
12 Output unit
13 Communication control unit
14 Storage unit
15 Control unit
15A Collection function unit
15B Determination function unit
15C Extraction function unit
15*a* Acquisition unit
15*b* Generation unit
15*c* Collection unit
15*d* Calculation unit
15*e* Learning unit
15*f* Determination unit
15*g* Extraction unit

The invention claimed is:

1. A determination device, comprising: processing circuitry configured to: calculate (i) first features of user-generated texts generated by legitimate users in a predetermined period and (ii) second features of user generated texts generated by a malicious user in the predetermined time period, the first and second features including (a) text features which represent characteristics of a combination of words co-occurring in a plurality of user-generated texts and (b) group features which represent a characteristic relating to word similarity between a plurality of user-generated texts generated in the predetermined period; train a model using the calculated first and second; and determine a particular user-generated text is generated by the malicious user using the trained model.

2. The determination device according to claim 1, wherein the group features include any one or more of a size of a set, a number of users in the set, a number of unique URLs described in the set, an average number of URLs described in the user-generated content in the set, or an average posting time interval in the set.

3. A determination method performed by a determination device, comprising: calculating (i) first features of user-generated texts generated by legitimate users in a predetermined period and (ii) second features of user generated texts generated by a malicious user in the predetermined time period, the first and second features including (a) text features which represent characteristics of a combination of words co-occurring in a plurality of user-generated texts and (b) group features which represent a characteristic relating to word similarity between a plurality of user-generated texts generated in the predetermined period; training a model using the calculated first and second features; and determining a particular user-generated text is generated by the malicious user using the trained model.

4. A non-transitory computer-readable recording medium storing therein a determination program that causes a computer to execute a process comprising: calculate (i) first features of user-generated texts generated by legitimate users in a predetermined period and (ii) second features of user generated texts generated by a malicious user in the predetermined time period, the first and second features including (a) text features which represent characteristics of a combination of words co-occurring in a plurality of user-generated texts and (b) group features which represent a characteristic relating to word similarity between a plurality of user-generated texts generated in the predetermined period; train a model using the calculated first and second features; and determine a particular user-generated text is generated by the malicious user using the trained model.

5. The determination device according to claim 1, wherein the processing circuitry is further configured to: access a URL described in the user-generated texts; and extract features relating to web content of a website reached via the accessed URL, the features extracted being used in training the model.

6. The determination device according to claim 1, wherein the processing circuitry is further configured to: generate a search query using words appearing in the user-generated texts; and collect user-generated content from a plurality of services using the search query, the collected user-generated content being used to calculate the first and second features.

7. The determination device according to claim 1, wherein the processing circuitry is further configured to: output attack features of the particular user-generated text as threat information when the particular user-generated text is determined to be generated by the malicious user.

8. The determination device according to claim 1, wherein the group features include a characteristic amount representing a size of a set of user-generated texts grouped based on a time threshold value and a similarity threshold value.

9. The determination device according to claim 1, wherein the group features include a characteristic amount representing a posting time of the plurality of user-generated texts generated in the predetermined period.

10. The determination device according to claim 1, wherein to calculate the text features, the processing circuitry is further configured to: segment words of a URL and text within the user-generated texts; generate word embeddings for the segmented words; and average the word embeddings to represent the text features.

* * * * *